United States Patent [19]

Fukumoto et al.

[11] 3,811,009

[45] May 14, 1974

[54] FACSIMILE DEVICE

[75] Inventors: Akira Fukumoto, Kawasaki; Toshihide Hane, Sakai; Hiroyoshi Tsuchiya, Kawasaki; Heijiro Hayami, Tokyo, all of Japan

[73] Assignee: Matsushita Electric Industrial Co., Ltd., Osaka, Japan

[22] Filed: Feb. 14, 1972

[21] Appl. No.: 225,827

[30] Foreign Application Priority Data

Feb. 25, 1971 Japan .............................. 46-10052

[52] U.S. Cl. .............................................. 178/6.7

[51] Int. Cl. ............................................ H04n 1/00

[58] Field of Search ...................... 178/7.3 D, 6.7, 6

[56] References Cited

UNITED STATES PATENTS

| | | | |
|---|---|---|---|
| 3,316,348 | 4/1967 | Hufnagel et al. | 178/6.7 R |
| 3,700,805 | 10/1972 | Hanlon | 178/7.3 D |
| 3,493,754 | 2/1970 | Black | 178/6.7 R |
| 3,314,075 | 4/1967 | Becker et al. | 178/6.7 R |
| 3,448,458 | 6/1969 | Carlson et al. | 178/6.7 R |

*Primary Examiner*—Gareth D. Shaw
*Attorney, Agent, or Firm*—Richard K. Stevens

[57] ABSTRACT

A facsimile device which makes use of a laser system as a light source to make possible high speed recording by modulating the laser beam through an acousto-optic modulator.

4 Claims, 4 Drawing Figures

FACSIMILE DEVICE

The present invention relates to a facsimile device.

In general, concerning the facsimile receiver which has for its object to transmit such high-density information as that stored on a sheet of newspaper, the compression of the information transmission time is a most fundamental requirement. For this purpose, a comparatively high frequency signal has to be resorted to, and this gives rise to a necessity for a light source to be modulated in response to high frequency variation. In the prior art systems, a discharge tube which follows up such comparatively high frequency signals is used as a light source of that kind. However, such prior art systems inherently have the following drawbacks.

a. The used discharge tube has a limited range of response to frequencies. Namely, the tube cannot follow up too extremely high frequency signals. For example, when a glow discharge tube is used, the maximum frequency with which the light from the glow tube can be modulated is about 1 MHz.

b. If the signal transmission time is greatly compressed, the time of exposure of the photosensitive material to light will be accordingly shortened. Therefore, the intensity of light during the exposure time needs to be increased. For this purpose, the operating current of the discharge tube has to be increased to a great extent.

c. With increasing operating current the life of the discharge tube is very much shortened. It is empirically known that the life of the tube is inversely proportional to the fourth power of the operating current.

d. The shortened life is accompanied by frequent substitution of the degraded tube by a new one. This substitution work will cause not only economic loss but also the disorder of the optical system. As a result, much time is needed for readjusting the disturbed optical system.

According to the present invention, the above mentioned drawbacks can be eliminated.

The object of the present invention is to provide a facsimile device which uses an acousto-optic light deflecting element in the modulating system and utilizes a laser beam as a light source.

For a better understanding, the invention will be described by way of an embodiment and by reference to the attached drawings, in which the same reference numerals are applied to like parts or elements throughout the drawings and in which.

Figure 1:
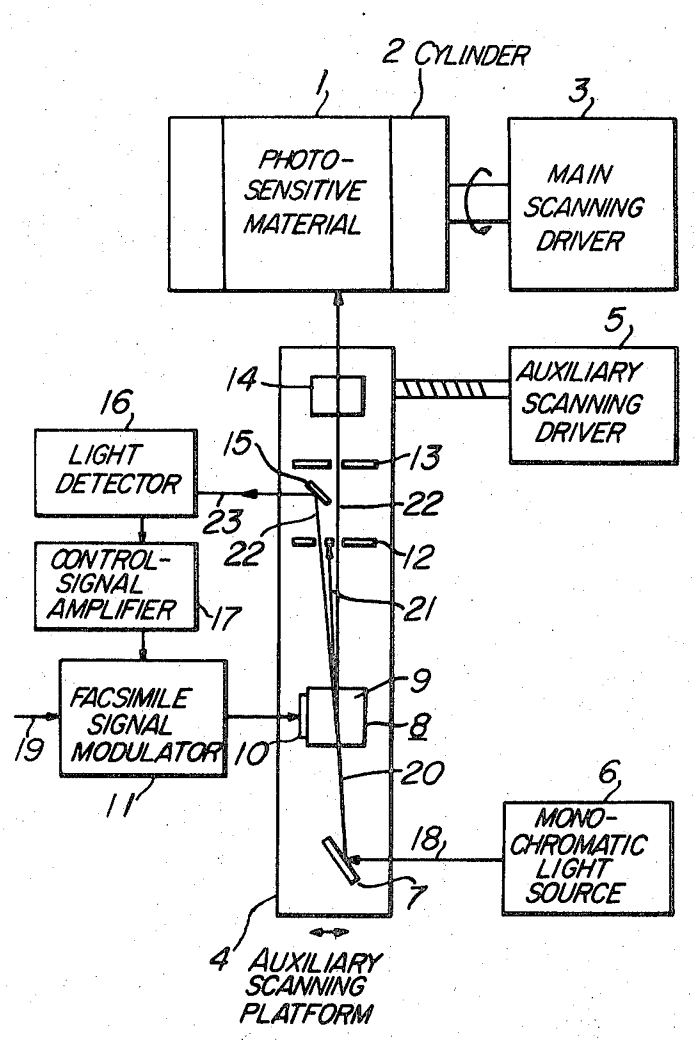
FIG. 1 is a schematic diagram of a facsimile device as one embodiment of the invention.

Referring to FIG. 1, a photosensitive material 1 for ordinary photography or electronic photography, which is rolled on a cylinder 2, has thereon optically recorded signals which have been transmitted from a transmitting end. The cylinder 2 is mechanically coupled to a main scanning driver 3, which can be rotated at a constant rate. An auxiliary scanning platform 4 carries thereon an optical system described later, which is also mechanically coupled to an auxiliary scanning driver 5 so that the platform 4 may move in a direction (auxiliary scanning direction) perpendicular to the rotational direction (main scanning direction) of the cylinder 2. A monochromatic light source 6 may be constituted of any suitable kind of laser apparatus. The monochromatic light source 6 may be mounted on the auxiliary scanning platform or otherwise put alongside of the platform and rigidly fixed, as seen in FIG. 1. If the light source 6 is mounted on the auxiliary scanning platform 4, the auxiliary scanning mechanism as a whole becomes large in size. On the other hand, if it is rigidly fixed in place other than on the platform, the diameter of the light spot on an acousto-optic modulator 8 vaires as the platform moves. Thus, each way of setting the position of the light source, as described above, has a demerit as well as a merit. In the embodiment of the present invention shown in the drawings, the monochromatic light source 6 is placed beside the auxiliary scanning platform. A light beam leaving the source 6 is directed toward the modulator 8 by means of a reflector 7. The acousto-optic light deflecting element 8 comprises a medium 9 which is composed of crystalline, amorphous or, if necessary, liquid material and which propagates supersonic waves and a transducer 10 which supplies supersonic waves for the medium 9. A signal modulator 11 supplies an electric signal for the acousto-optic light deflecting element 8. A slit 12 blocks a superfluous and unnecessary part of the light beam from the modulator 8 while a lens system 14 focuses on the photosensitive material 1 the light emitted from a window 13. A control-beam extractor 15 such as a reflector or a semi transparent reflector separates a part of the modulated beam. A light detector 16 receives the part of the modulated beam and converts it to an electric signal. A control signal amplifier 17 appropriately amplifies the output from the light detector 16 and delivers an output to be applied to the modulator 11 in order to obtain properly controlled modulation.

Figure 2:
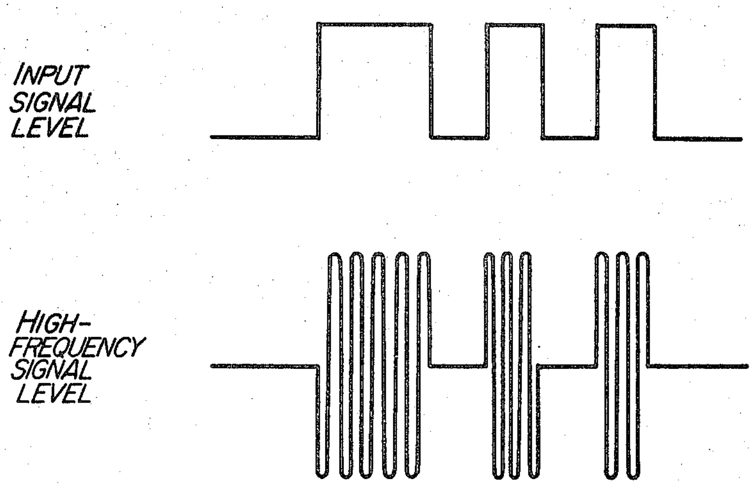
FIGS. 2 and 3 show waveforms for comparatively illustrating facsimile signals and corresponding h–f signals modulated by the facsimile signals and fed to a tranducer.
Figure 3:
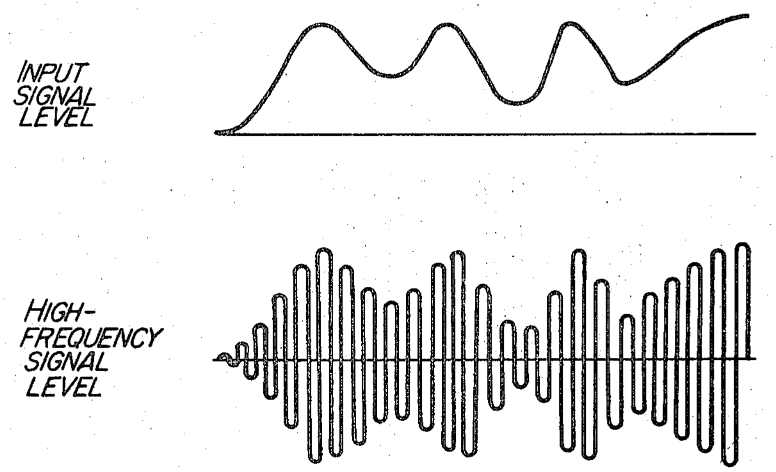

Now, the operation of the device having such a constitution as described above will be explained. As soon as the facsimile device has come under the receiving condition, main and auxiliary scanning movements are started in a certain synchronism with an imput signal due to cooperation of the main and auxiliary scanning drivers 3 and 5. Meanwhile, the monochromatic light source 6 supplies a continuous beam 18 for the light deflecting element 8 mounted on the auxiliary scanning platform 4. A facsimile input signal 19 received through a suitable transmission system is converted to an amplitude-modulated *h–f* signal by the signal modulator 11, and is fed to the transducer 10 in the acousto-optic light deflecting element and converted therethrough to a supersonic wave signal. The waveforms of the input signal from the transmission system and the AM *h–f* signal are seen respectively in FIGS. 2 and 3. FIG. 2 employs a digital representation while FIG. 3 is in analog representation. The acousto-optical light deflecting element 8 utilizes an acousto-optical interaction called Roman-Nath scattering or Brillouin scattering and splits the incident light 20 into two beams; i.e., the light beam of zeroth-order-diffraction 21 traveling in the same direction as the incident beam 20 and the light beam of higher-order-diffraction 22 traveling in a direction deviated from that of the incident beam 20. The refraction angle of the higher-order-diffraction beam 22 is determined by the *h–f* signal obtained through modulation with the facsimile signal and applied to the light deflecting element 8. Therefore, the higher-order-diffraction beam having passed through the fixed slit 12 is the beam amplitude-moldulated by the facsimile input signal which beam is cast upon the photosensitive material 1 through the focussing slit 13. The intensity of refracted light passing through the slit 12 varies depending upon the degree of refraction by the element 8, and the quantity corresponds to the degree of modulation in response to the facsimile signal 19. Under normal operating conditions it is effective to take out only the light beam of (±) first-order-diffraction by means of the slit 12. A part of the refracted beam 23 is directed toward the light detector 16 such as a phototransistor by means of the control-beam extractor 15 using a suitable means such as a reflector and used for the purpose of monitoring and compensating the intensity of the refracted light beam. The output of the light detector 16 is appropriately amplified by the control-signal amplifier 17 and fed back to the signal modulator 11 in a suitable phase relation to the original facsimile signal. Namely, the operation of the signal modulator 11 is always corrected in such a manner that the intensity of the modulated beam may have a certain fixed relation to that of the input signal. The control beam 23 used to correct the intensity of the modulated beam may consist of a part of the beam cast upon the photosensitive material 1 or a beam of other diffractions or a beam incident upon the light deflecting element 8. For example, the beam of the (+) first-order-diffraction may be used as the beam to be projected upon the photosensitive material 1 and the beam of the (−) first-order-diffraction may be used as the beam to be supplied to the light detector 16. The remaining part of the modulated beam is then cast upon the slit 13, the real image of which is formed on the surface of the photosensitive material 1 to record thereon a predetermined signal image.

In such a facsimile device as described above, the frequency range available for modulating the beam used is determined by the allowable frequency band width of the transducer 10 and the diameter of the incident beam. By appropriately determining the diameter of the beam and using a suitable transducer, the band width of the modulating frequencies can be considerably increased in comparison with that attainable with the conventional method. For example, if a transducer made of $LiNbO_3$ (*z*-plate) having center frequency of 40 Mhz is used, a band width more than 10 MHz with a gain of 3db can be obtained. If a discharge tube is used as a modulating light source, a constant current has to be drawn to the tube even during the time when there is no facsimile signal in order to retain the discharge of the tube. As a result, the discharge tube slightly glows even when there is no facsimile signal reaching the receiver. Therefore, the degree of modulation completely covering from 0 to 100 percent cannot be attained since the degree of glow extinction is low.

On the other hand, according to the present invention, the higher-order-diffraction beam will completely vanish when there is no facsimile signal so that the light extinction ratio is theoretically infinite. Moreover, by utilizing laser beam as a light source there is provided a far intenser light beam to be modulated than is available with the conventional means. If, for example, argon ion laser is employed, a modulated beam having energy of several watts can be delivered. Further, since the life of the modulator used can be prolonged very much if certain operating conditions are satisfied, it may be stated that the span of the modulator life depends on the monochromatic light source used. It is generally observed that the life of the laser source is more than $10^3$ times as long as that of the conventional light source. In addition, only an *h–f* power to excite the acousto-optical deflecting element is needed in the process of modulation. Furthermore, with an appropriate medium for propagating supersonic waves such as an *h–f* power could be reduced to a very small value. Consequently, the device as a whole can be easily simplified. For example, if $HIO_3$, $PbMoO_4$, $TeO_2$ or $Pb_5(GeO_4)(VO_4)_2$ is used for the medium, only an exciting *h–f* power of several hundred milliwatts is needed. And a still further merit due to employment of a laser system as a light source is the simplification of design of the optical system. Namely, a laser beam inherently has a tendency to diverge only a little so that a parallel beam of light can be easily obtained. The laser beam consists of monochromatic light rays so that no chromatic aberration should be taken into consideration, thus lenses and reflectors being more easily designed, fabricated and adjusted than in the conventional device.

Next, the detailed description should be given to the aforementioned acousto-optical light deflecting element. As described above, the deflecting element according to the invention utilizes a phenomenon called Roman-Nath scattering and Brillouin scattering. The latter phenomenon is due to the fact that the incident light beam fed into a substance is deviated from its direction of incidence by an angle twice as large as an angle defined as the Bragg's angle for the substance due to the interaction between the incident light and supersonic waves or acoustical wave motion generated in the substance.

The ratio of the intensity of the beam to be modulated to that of the incident beam, i.e., deflection efficiency $\eta$, is defined by the expression $$\eta = \pi^2 \mathrm{Me} W \mathrm{Pa}/2\,\lambda^2 h,$$

where $W$ designates the width of the sound flux, $h$ the height thereof, $\lambda$ the wave length of the light of the beam in vacuum, Pa the sound wave input power, and Me a constant determined depending upon the medium to effect the deflection of the light beam. The above expression has been derived with the effect of the sound waves and the light waves attenuating in the medium neglected and with Pa assumed to be small. The deflection efficiencies calculated for the cases other than this one just described, are also known, but they are not mentioned herein. One of the requirements which a light deflector has to fulfill is that the deflection efficiency $\eta$ is high. For this purpose, it is necessary to employ a material having a large value for Me as the medium. In the conventional light deflector, such materials as water (Me = $160 \times 10^{-18}$ $sec^3/g$), fused quartz (Me = $1.5 \times 10^{-18}$ $sec^3/g$), lithium niobate (Me = $6.99 \times 10^{-18}$ $sec^3/g$), lead molybdate (Me = $35.5 \times 10^{-18}$ $sec^3/g$), $\alpha$-iodic acid ($83.3 \times 10^{-18}$ $sec^3/g$), or strontium barium niobate ($38.6 \times 10^{-18}$ $sec^3/g$) were preferably used as the medium for propagating longitudinal supersonic waves. Each of these materials has on the one hand merits and on the other hand demerits from the standpoint of property, economics, simplicity in fabrication and ease in handling. For example, if water is used as the medium, the deflection efficiency is very high while the modulated beam fluctuates in space. Fused quartz and lithium niobate have low deflection efficiency and the latter is expensive. Lead molybdate and strontium barium niobate and are expensive and above all a high quality or pure crystal of each of them is very hard to produce. α-iodic acid is soluble in water and the handling thereof is not easy.

The present invention, however, provides a very recommendable material to serve as such a medium, which material comprises vitreous matter containing tellurium, tungsten, lithium and lead. The value of Me of this material is $23.9 \times 10^{-18}$ $sec^3/g$ for horizontal polarization and $20.9 \times 10^{-18}$ $sec^3/g$ for vertical polarization. On the other hand, the value of Me of fused quartz is $0.304 \times 10^{-18}$ $sec^3/g$ for horizontal polarization and $1.51 \times 10^{-18}$ $sec^3/g$ for vertical one. The vitreous matter is composed of: 35.5 percent by weight of $WO_3$, 2.6 percent by weight of $LiO_2$, 2.6 percent by weight of PbO, and 59.5 percent by weight of $TeO_2$. With this acousto-optical light deflecting element containing therein tellurium, tungsten, lithium and lead as its components, a rather intense modulated light beam can be obtained without any fluctuation of the beam observed with liquid medium. Further, there is eliminated a difficulty encountered in the process of production of a conventional solid crystal deflector on the basis of crystal growth technique. Moreover, the medium according to the invention is not crystal but vitreous matter so that a large and homogeneous deflecting element can be obtained. And this vitreous medium is less expensive than the prior art crystalline medium. Furthermore, the former is not adversely affected by water and can be safely preserved, and its acoustic attenuation constant is very small, equal to about one fifth of that of water at 50 MHz.

Finally, a detailed description should be made of the artifice to correct the operation of the signal modulator 11 in such a manner that the intensity of the modulated beam may always be kept in a certain constant relation to the intensity of the input signal. The aforementioned deflection efficiency can also be given by the expression $$\eta = I_1 / I_o,$$

where $I_o$ indicates the intensity of the radiation emitted from the light source itself and $I_1$ the intensity of the deflected beam. Conventionally, the intensity $I_o$ of the radiation from the source and the acoustic input Pa were made constant by stabilizing the voltages applied to the light source and sound wave generator so that the efficiency $\eta$ may be stabilized. However, this added to the complexity and the cost of the facsimile device as a whole. Further, in the prior art system, instability such as that due to variation in the light source, temperature change in the deflecting element or the variation in characteristic with time could not be avoided, except that caused by variation in the source.

Figure 4:
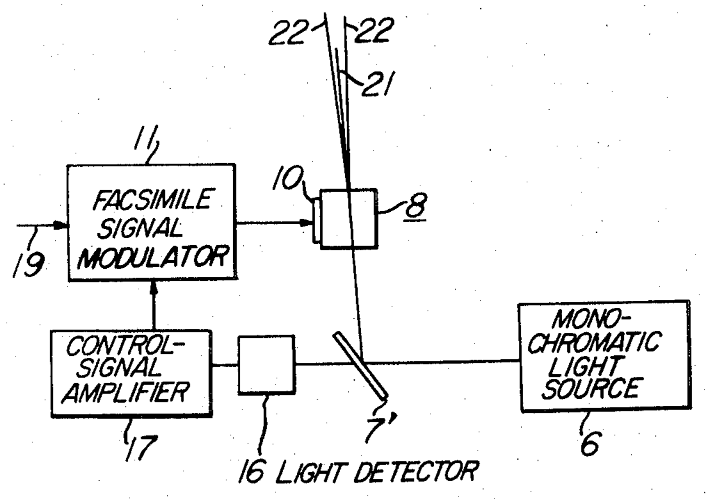
FIG. 4 shows another embodiment of the invention in which only a part of the facsimile decvice shown in FIG. 1 is modified.

On the other hand, if a part of the modulated light beam is extracted and used to control the modulator 11, as shown in FIG. 1 which shows a facsimile device as one embodiment of the present invention, such a nuisance as mentioned above can be eliminated. For example, within a range of operation where the relation $\eta = I_1/I_o = \pi^2 \mathrm{Me} W \mathrm{Pa}/2\lambda^2 h$ holds, the electric output of the modulator 11 is in proportion to the intensity of the light beam of the first-order-diffraction so that if the output in the form of a beam 18 from the monochromatic light source 6 is decreased, the decrease causes a corresponding increase in the electric output so as to make constant the intensity of the refracted beam which is to form an image on the recording medium. In the above described embodiment shown in FIG. 1, a part of the diffracted beam is extracted and fed back, however, another arrangement as shown in FIG. 4 is possible for the achievement of the same purpose, in which a semi-transparent reflector 7' is used in place of the full reflector 7 used in the embodiment of FIG. 1 and a part of the laser beam from the source 6 is extracted to be applied to a light detector 16 which converts the part of the laser beam to the corresponding electrical signal to control the modulator 11 after amplification through an amplifier 17. In addition, if the beam of the first-order-diffraction is used as the modulated beam, then the beam of any higher-order-diffraction other than the first-order-diffraction may be extracted to serve as a control beam. In this way, the device in which a feedback loop is provided so as to control the modulator can be largely simplified in structure in comparison with the prior art device in which the outputs from the light source and the signal generator are separately stabilized. Moreover, according to the invention, the variation in level in each unit can be simultaneously corrected, the correction is optimum and accurate, and also the change in the characteristic of the deflecting element itself can be compensated for. Furthermore, if a beam other than that supplied to the recording medium is used as a control beam, the control beam has no influence on the recording medium.

What we claim is:

1. A facsimile apparatus, comprising:

a laser source generating a beam of coherent light;

modulating means for modulating a high frequency signal by a facsimile signal received by the facsimile apparatus;

means coupled to said modulating means and interposed in the path of said beam of coherent light for delfecting said beam passing therethrough, the amount of deflection of said beam being proportional to a modulated output signal from said modulating means, said deflecting means including, an acousto-optic element through which said beam is passed, and an electro-acoustic transducer for propagating an acoustic wave through said acousto-optic element substantially transversely of the direction of travel of said beam, said propagated wave being a function of the modulated output signal of said modulating means:

a light-intercepting member interposed in the path of said beam downstream of said deflecting means, said light-intercepting member having a slit therein for passing a portion of said beam, the portion of the beam which is so passed being proportional to the amount of deflection of said beam due to said deflecting means; and a recording medium located downstream of said light-intercepting member, the portion of the beam passed through said slit impinging on said recording medium to reproduce the image corresponding to the facsimile signal received by the apparatus.

2. The apparatus according to claim 1, further comprising means for detecting the specific intensity of a portion of the light beam having passed through said acousto-optic element and for generating an electric signal proportional to the detected intensity of said passed beam; and means feeding said signal proportional to the detected intensity back to said modulating means to compensate for variations in the specific intensity of the deflected light beam.

3. The apparatus according to claim 1, further comprising means for detecting the specific intensity of a portion of the light beam generated by said laser source and for generating an electric signal proportional to the detected intensity of the source beam; and means for supplying said signal proportional to the detected intensity to said modulating means to compensate for variations in the intensity of the light generated by said laser source.

4. A facsimile device according to claim 1, wherein said acousto-optical element comprises an ultrasonic wave transmitting medium which is a vitreous material containing tellurium, tungsten, lithium and lead.

* * * * *